(12) United States Patent
Hasskerl et al.

(10) Patent No.: US 7,235,305 B2
(45) Date of Patent: Jun. 26, 2007

(54) SELF-CLEANING SYNTHETIC BODY AND METHOD FOR PRODUCING THE SAME

(75) Inventors: Thomas Hasskerl, Kronberg (DE); Rolf Neeb, Pfungstadt (DE); Ghirmay Seyoum, Egelsbach (DE)

(73) Assignee: Röhm GmbH & Co. KG, Darmstadt (DE)

( * ) Notice: Subject to any disclaimer, the term of this patent is extended or adjusted under 35 U.S.C. 154(b) by 205 days.

(21) Appl. No.: 10/508,844

(22) PCT Filed: May 20, 2003

(86) PCT No.: PCT/EP03/05278

§ 371 (c)(1), (2), (4) Date: Sep. 23, 2004

(87) PCT Pub. No.: WO03/102056

PCT Pub. Date: Dec. 11, 2003

(65) Prior Publication Data

US 2005/0118434 A1 Jun. 2, 2005

(30) Foreign Application Priority Data

Jun. 4, 2002 (DE) ............ 102 24 895

(51) Int. Cl.
*B32B 25/20* (2006.01)
(52) U.S. Cl. ............ 428/447; 428/451
(58) Field of Classification Search ............ 428/447, 428/451
See application file for complete search history.

(56) References Cited

U.S. PATENT DOCUMENTS

| | | | |
|---|---|---|---|
| 5,880,235 A | 3/1999 | Schwind et al. | |
| 6,335,061 B1 * | 1/2002 | Kanamori et al. | 427/515 |
| 6,743,520 B2 * | 6/2004 | Street et al. | 428/483 |
| 2002/0023800 A1 | 2/2002 | Ohmori et al. | |
| 2004/0191485 A1 | 9/2004 | Groothues et al. | |
| 2004/0213989 A1 | 10/2004 | Hasskerl et al. | |
| 2005/0016213 A1 | 1/2005 | Hasskerl et al. | |
| 2005/0118434 A1 | 6/2005 | Hasskerl et al. | |

FOREIGN PATENT DOCUMENTS

| | | |
|---|---|---|
| EP | 0 816 466 | 1/1998 |
| EP | 1 022 318 | 7/2000 |
| WO | 02/00785 | * 1/2002 |

OTHER PUBLICATIONS

U.S. Appl. No. 10/548,878, filed Sep. 14, 2005, Hasskerl et al.
U.S. Appl. No. 10/523,971, filed Feb. 8, 2005, Theil et al.
U.S. Appl. No. 10/539,057, filed Jun. 15, 2005, Hasskerl et al.
U.S. Appl. No. 10/538,887, filed Jun. 14, 2005, Hasskerl et al.
U.S. Appl. No. 10/539,126, filed Jun. 16, 2005, Hasskerl et al.

* cited by examiner

*Primary Examiner*—Kuo-Liang Peng
(74) *Attorney, Agent, or Firm*—Oblon, Spivak, McClelland, Maier & Neustadt, P.C.

(57) ABSTRACT

The invention relates to self-cleaning synthetic bodies, obtained as follows: a) a siloxane coating (a) is applied to a synthetic substrate and cured, b) the polar fraction of the surface energy of the cured siloxane coating on the substrate is increased to a value of at least 10 mN/m and c) a coating (b) containing photocatalytically active $TiO_2$ particles is applied to the synthetic substrate and cured.

25 Claims, No Drawings

SELF-CLEANING SYNTHETIC BODY AND METHOD FOR PRODUCING THE SAME

The present invention relates to self-cleaning plastics articles which have siloxane coatings with $TiO_2$ particles.

Self-cleaning articles become superhydrophilic through irradiation with UV light in the presence of water, and are capable of breaking down organic contamination to give carbon dioxide and water. This property of the surface is generally achieved via the photocatalytic effect of titanium dioxide, which can be fixed to solid supports and, for example, securely bonded to the substrate by stoving at high temperatures. An example is provided by silicate glasses for self-cleaning windows, as described by Rhodia Chemie in EP 850 203 B1.

For esthetic reasons, plastics substrates, e.g. acrylic sheet or polycarbonate widely used as glazing material or for transparent noise barriers are intended to have a maximum of transparency and cleanliness, in order to permit clear visibility of the surrounding landscape for railway passengers or drivers of automobiles. They are especially used on bridges, but also to relieve the monotony of concrete noise barriers, and are intended to contribute to a reduction in the fatigue experienced by drivers of automobiles.

Automotive exhaust gases, abraded tire material, dust and organic contamination are causes of rapid deterioration in the attractiveness and esthetic properties of transparent noise barriers. Numerous attempts have therefore been made to equip transparent plastics with self-cleaning coatings. The aim here has been to make the photocatalytic activity of titanium dioxide available for decomposing the contamination adhering to the substrate surface, but on the other hand to protect the organic substrate itself from damage due to the titanium dioxide.

Plastics articles provided with self-cleaning siloxane coatings are likewise known. These substrates usually have a double layer of siloxane with different composition, only the outer layer comprising a photocatalytic additive, such as the anatase or brookite form of $TiO_2$.

By way of example, the Publication EP-A-1 022 318 describes coated sheets of plastic which have a photocatalytic layer. However, the examples merely give sheets or films with a thin coating totaling 1.2 μm, and these thin coatings have only very low scratch resistance.

Although the description says that it is also possible to obtain thicker layers, the only indication given is that thicker layers can be obtained via repeated application of siloxane coating compositions. However, without the use of additives the $TiO_2$-containing siloxane layer lacks adhesion to the siloxane layer initially applied, which serves as primer to protect the underlying plastics article.

In order to solve the problem of insufficient substrate adhesion, use may be made of inorganic-organic layers composed of siloxane networks, as the layer isolating the plastics substrate. Given a suitable composition, the adhesion of the layers is markedly better than that of purely inorganic material, and the hybrid character of the layers makes them more resistant than purely organic layers to the photocatalytic activity of the titanium dioxide.

However, experiments have shown that weathering, in particular UV irradiation, reduces, over the course of time, the scratch resistance of plastics articles provided with inorganic-organic layers, thus reducing the transparency of the plastics articles. In addition, the scratch resistance immediately after production is also unsatisfactory.

Problems with these plastics articles of the prior art are therefore their low scratch resistance or their low weathering resistance. The result is that environmental effects cause ablation of the coating over the course of time, and they therefore lose their self-cleaning capability.

In the light of the prior art stated and discussed herein, it was therefore an object of the present invention to provide self-cleaning plastics articles which have particularly high scratch resistance.

Another object of the invention consisted in plastics articles with high durability, in particular high resistance to weathering or UV irradiation.

Another object underlying the invention was to provide scratch-resistant, self-cleaning plastics articles which are capable of particularly simple production. For example, the substrates which can be used to produce the plastics articles should in particular be those obtainable via extrusion or injection molding, or else via casting processes.

It was moreover therefore an object of the present invention to provide plastics articles capable of production at low cost.

Another object of the present invention consisted in providing scratch-resistant, self-cleaning plastics articles which have excellent mechanical properties. This property is particularly important for applications where the plastics article is to have high resistance to impact.

The plastics articles should moreover have particularly good optical properties.

Another object of the present invention consisted in providing plastics articles whose size and shape can easily be adapted to requirements.

The plastics articles described in claim 1 achieve these objects and also achieve other objects which, although they are not specifically mentioned, are obvious or necessary consequences of the circumstances discussed herein. Useful modifications of the plastics articles of the invention are protected by the subclaims dependent on claim 1.

Claim 22 achieves the underlying object in relation to a production process.

Self-cleaning plastics articles which have particularly high scratch resistance are successfully provided by taking a plastics substrate and a) applying and curing a siloxane coating (a),
b) increasing the polar component of the surface energy of the cured siloxane coating to a value of at least 10 mN/m and
c) applying and curing a coating (b) comprising photocatalytic $TiO_2$ particles.

Particular advantages, inter alia, achieved by the measures of the invention are the following:

The plastics articles of the present invention are highly resistant to surface scratching.
The plastics articles of the invention have high resistance to UV irradiation.
Plastics articles moreover exhibit a particularly high level of self-cleaning even when the level of UV irradiation is very low.
The plastics articles of the present invention can moreover be produced at particularly low cost, with no need to use expensive additives.
The present invention moreover permits the production of self-cleaning coatings on plastics substrates previously coated with siloxanes. A particular advantage of this is that it is possible to take sheets from the production of plastics articles provided with scratch-resistant coatings and then subsequently provide these sheets with another coating which has self-cleaning properties.
The scratch-resistant plastics articles of the present invention may be adapted to certain requirements. In particular, the size and the shape of the plastics article may be varied within a wide range, with no resultant impairment of its scratch resistance or self-cleaning property. Furthermore, the present invention also provides plastics articles with excellent optical properties.

The scratch-resistant plastics articles of the present invention have good mechanical properties.

The plastics articles of the invention are obtainable through coating of plastics substrates. Suitable plastics substrates for the purposes of the present invention are known per se. These substrates encompass in particular polycarbonates, polystyrenes, polyesters, such as polyethylene terephthalate (PET) and polybutylene terephthalate (PBT), cycloolefinic polymers (COC), and/or poly(meth)acrylates. Preference is given here to polycarbonates, cycloolefinic polymers and poly(meth)acrylates, particular preference being given to poly(meth)acrylates.

Polycarbonates are known to persons skilled in the art. Polycarbonates may be formally regarded as polyesters composed of carbonic acid and of aliphatic or aromatic dihydroxy compounds. They are easily obtainable by reacting diglycols or bisphenols with phosgene or carbonic diesters in polycondensation or transesterification reactions.

Preference is given here to polycarbonates which derive from bisphenols. Particular bisphenols among these are 2,2-bis(4-hydroxyphenyl)propane (bisphenol A), 2,2-bis-(4-hydroxyphenyl)butane (bisphenol B), 1,1-bis-(4-hydroxyphenyl)cyclohexane (bisphenol C), 2,2'-methylenediphenol (bisphenol F), 2,2-bis(3,5-dibromo-4-hydroxyphenyl) propane (tetrabromobisphenol A) and 2,2'-bis(3,5-dimethyl-4-hydroxyphenyl)propane (tetramethyl-bisphenol A).

These aromatic polycarbonates are usually prepared by interfacial polycondensation or by transesterification, details being given in Encycl. Polym. Sci. Engng. 11, 648-718.

In interfacial polycondensation, the bisphenols in the form of aqueous alkaline solution are emulsified in inert organic solvents, such as methylene chloride, chlorobenzene or tetrahydrofuran, and reacted with phosgene in a reaction involving stages. Amines are used as catalysts, and phase-transfer catalysts are used in the case of sterically hindered bisphenols. The resultant polymers are soluble in the organic solvents used.

The properties of the polymers may be varied widely via the selection of the bisphenols. If different bisphenols are used together, block polymers can also be constructed in multistage polycondensations.

Cycloolefinic polymers are polymers obtainable by using cyclic olefins, in particular by using polycyclic olefins.

Cyclic olefins encompass, for example, monocyclic olefins, such as cyclopentene, cyclopentadiene, cyclohexene, cycloheptene, cyclooctene, and also alkyl derivatives of these monocyclic olefins having from 1 to 3 carbon atoms, examples being methyl, ethyl or propyl, e.g. methylcyclohexene or dimethylcyclohexene, and also acrylate and/or methacrylate derivatives of these monocyclic compounds. Furthermore, cycloalkanes having olefinic side chains may also be used as cyclic olefins, an example being cyclopentyl methacrylate.

Preference is given to bridged polycyclic olefin compounds. These polycyclic olefin compounds may have the double bond either in the ring, in which case they are bridged polycyclic cycloalkenes, or else in side chains. In that case they are vinyl derivatives, allyloxycarboxy derivatives or (meth)acryloxy derivatives of polycyclic cycloalkane compounds. These compounds may also have alkyl, aryl or aralkyl substituents.

Without any intended resultant restriction, examples of polycyclic compounds are bicyclo[2.2.1]hept-2-ene (norbornene), bicyclo[2.2.1]hept-2,5-diene (2,5-norbornadiene), ethylbicyclo[2.2.1]hept-2-ene (ethylnorbornene), ethylidenebicyclo[2.2.1]hept-2-ene (ethylidene-2-norbornene), phenylbicyclo[2.2.1]hept-2-ene, bicyclo[4.3.0]nona-3,8-diene, tricyclo[4.3.0.1$^{2,5}$]-3-decene, tricyclo[4.3.0.1$^{2,5}$]-3,8-decene-(3,8-dihydrodicyclopentadiene), tricyclo[4.4.0.1$^{2,5}$]-3-undecene, tetracyclo[4.4.0.1$^{2,5}$, 1$^{7,10}$]-3-dodecene, ethylidenetetracyclo[4.4.0.1$^{2,5}$.1$^{7,10}$]-3-dodecene, methyloxycarbonyl-tetracyclo[4.4.0.1$^{2,5}$, 1$^{7,10}$]-3-dodecene, ethylidene-9-ethyltetracyclo[4.4.0.1$^{2,5}$, 1$^{7,10}$]-3-dodecene, pentacyclo-[4.7.0.1$^{2,5}$, O, O$^{3,13}$, 1$^{9,12}$]-3-pentadecene, pentacyclo-[6.1.1$^{3,6}$.0$^{2,7}$.0$^{9,13}$]-4-pentadecene, hexacyclo-[6.6.1.1$^{3,6}$.1$^{10,13}$.0$^{2,7}$.0$^{9,14}$]-4-heptadecene, dimethylhexacyclo[6.6.1.1$^{3,6}$.1$^{10,13}$.0$^{2,7}$.0$^{9,14}$]-4-heptadecene, bis-(allyloxycarboxy)tricyclo[4.3.0.1$^{2,5}$]decane, bis(meth-acryloxy)tricyclo[4.3.0.1$^{2,5}$]decane, bis(acryloxy)tricyclo[4.3.0.1$^{2,5}$]decane.

The cycloolefinic polymers are prepared using at least one of the cycloolefinic compounds described above, in particular the polycyclic hydrocarbon compounds. The preparation of the cycloolefinic polymers may, furthermore, use other olefins which can be copolymerized with the abovementioned cycloolefinic monomers. Examples of these are ethylene, propylene, isoprene, butadiene, methylpentene, styrene, and vinyltoluene.

Most of the abovementioned olefins, and in particular the cycloolefins and polycycloolefins, may be obtained commercially. Many cyclic and polycyclic olefins are moreover obtainable by Diels-Alder addition reactions.

The cycloolefinic polymers may be prepared in a known manner, as set out inter alia in the Japanese Patent Specifications 11818/1972, 43412/1983, 1442/1986 and 19761/1987 and in the published Japanese Patent Applications Nos. 75700/1975, 129434/1980, 127728/1983, 168708/1985, 271308/1986, 221118/1988 and 180976/1990 and in the European Patent Applications EP-A-0 6 610 851, EP-A-0 6 485 893, EP-A-0 6 407 870 and EP-A-0 6 688 801.

The cycloolefinic polymers may, for example, be polymerized in a solvent, using aluminum compounds, vanadium compounds, tungsten compounds or boron compounds as catalyst.

It is assumed that, depending on the conditions, in particular on the catalyst used, the polymerization can proceed with ring-opening or with opening of the double bond.

It is also possible to obtain cycloolefinic polymers by free-radical polymerization, using light or an initiator as free-radical generator. This applies in particular to the acryloyl derivatives of the cycloolefins and/or cycloalkanes. This type of polymerization may take place either in solution or else in bulk.

Another preferred plastics substrate encompasses poly(meth)acrylates. These polymers are generally obtained by free-radical polymerization of mixtures which comprise (meth)acrylates. The term (meth)acryl-ates encompasses methacrylates and acrylates, and also mixtures of the two.

These monomers are well known. Among them are, inter alia, (meth)acrylates derived from saturated alcohols, e.g. methyl(meth)acrylate, ethyl(meth)acrylate, propyl(meth)acrylate, n-butyl(meth)acrylate, tert-butyl (meth)acrylate, pentyl(meth)acrylate and 2-ethylhexyl(meth)acrylate; (meth)acrylates derived from unsaturated alcohols, e.g. oleyl (meth)acrylate, 2-propynyl(meth)acrylate, allyl(meth)acrylate, vinyl (meth)acrylate;

aryl(meth)acrylates, such as benzyl(meth)acrylate or phenyl(meth)acrylate, where each of the aryl radicals may be unsubstituted or have up to four substituents;

cycloalkyl(meth)acrylates, such as 3-vinylcyclohexyl (meth)acrylate, bornyl(meth)acrylate;

hydroxyalkyl(meth)acrylates, such as 3-hydroxypropyl (meth)acrylate, 3,4-dihydroxybutyl(meth)acrylate, 2-hydroxyethyl(meth)acrylate, 2-hydroxypropyl(meth)-acrylate;

glycol di(meth)acrylates, such as 1,4-butanediol di(meth)acrylate, (meth)acrylates of ether alcohols, such as tetrahydrofurfuryl(meth)acrylate, vinyloxyethoxyethyl (meth)acrylate;

amides and nitriles of (meth)acrylic acid, such as N-(3-dimethylaminopropyl)(meth)acrylamide, N-(diethylphosphono)(meth)acrylamide, 1-methacryloylamido-2-methyl-2-propanol;

sulfur-containing methacrylates, such as methylsulfinylethyl(meth)acrylate, 4-thiocyanatobutyl(meth)acrylate, ethylsulfonylethyl(meth)acrylate, thiocyanatomethyl(meth)acrylate, methylsulfinylmethyl(meth)acrylate, bis((meth)acryloyloxyethyl)sulfide;

multifunctional (meth)acrylates, such as trimethyloylpropane tri(meth)acrylate, pentaerythritol tetra(meth)acrylate and pentaerythritol tri(meth)acrylate.

In one preferred aspect of the present invention, these mixtures comprise at least 40% by weight, preferably at least 60% by weight, and particularly preferably at least 80% by weight, of methyl methacrylate, based on the weight of monomers.

Besides the (meth)acrylates set out above, the compositions to be polymerized may also comprise other unsaturated monomers which are copolymerizable with methyl methacrylate and with the above-mentioned (meth)acrylates.

Examples of these are 1-alkenes, such as 1-hexene, 1-heptene; branched alkenes, such as vinylcyclohexane, 3,3-dimethyl-1-propene, 3-methyl-1-diisobutylene, 4-methyl-1-pentene;

acrylonitrile; vinyl esters, such as vinyl acetate; styrene, substituted styrenes having one alkyl substituent in the side chain, e.g. α-methylstyrene and α-ethylstyrene, substituted styrenes having one alkyl substituent on the ring, e.g. vinyltoluene and p-methylstyrene, halogenated styrenes, such as monochlorostyrenes, dichlorostyrenes, tribromostyrenes, and tetrabromostyrenes;

heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles, and hydrogenated vinylthiazoles, vinyloxazoles and hydrogenated vinyloxazoles;

vinyl and isoprenyl ethers;

maleic acid derivatives, such as maleic anhydride, methylmaleic anhydride, maleimide, methylmaleimide; and dienes, such as divinylbenzene.

The amount generally used of these comonomers is from 0 to 60% by weight, preferably from 0 to 40% by weight, and particularly preferably from 0 to 20% by weight, based on the weight of the monomers, and the compounds here may be used individually or as a mixture.

The polymerization is generally initiated by known free-radical initiators. Examples of preferred initiators are the azo initiators well known to persons skilled in the art, e.g. AIBN and 1,1-azobiscyclohexanecarbonitrile, and also peroxy compounds, such as methyl ethyl ketone peroxide, acetylacetone peroxide, dilauryl peroxide, tert-butyl per-2-ethylhexanoate, ketone peroxide, methyl isobutyl ketone peroxide, cyclohexanone peroxide, dibenzoyl peroxide, tert-butyl peroxybenzoate, tert-butylperoxy isopropyl carbonate, 2,5-bis(2-ethylhexanoylperoxy)-2,5-dimethylhexane, tert-butylperoxy 2-ethylhexanoate, tert-butylperoxy 3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, 1,1-bis(tert-butyl hydroperoxide, bis(4-tert-butyl-cyclohexyl) peroxydicarbonate, mixtures of two or more of the abovementioned compounds with one another, and also mixtures of the abovementioned compounds with compounds not mentioned which can likewise form free radicals.

The amount often used of these compounds is from 0.01 to 10% by weight, preferably from 0.5 to 3% by weight, based on the weight of the monomers.

The abovementioned polymers may be used individually or as a mixture. Use may also be made here of various polycarbonates, poly(meth)acrylates or cycloolefinic polymers which differ, for example, in molecular weight or in monomer composition.

The plastics substrates of the invention may, for example, be produced from molding compositions of the abovementioned polymers. For this, use is generally made of thermoplastic shaping processes, such as extrusion or injection molding.

The weight-average molar mass $M_w$ of the homo- and/or copolymers to be used according to the invention as molding compositions for producing the plastics substrates may vary within a wide range, the molar mass usually being matched to the application and the method used for processing the molding composition. However, with no intended resultant restriction, it is generally in the range from 20 000 to 1 000 000 g/mol, preferably from 50 000 to 500 000 g/mol, and particularly preferably from 80 000 to 300 000 g/mol.

The plastics substrates may also be produced by cell casting processes. In these, by way of example, suitable (meth)acrylic mixtures are charged to a mold and polymerized. These (meth)acrylic mixtures generally comprise the (meth)acrylates set out above, in particular methyl methacrylate. The (meth)acrylic mixtures may moreover comprise the copolymers set out above, and also, in particular for viscosity adjustment, may comprise polymers, in particular poly(meth)acrylates.

The molding compositions used to produce the plastics substrates, and also the acrylic resins, may also comprise conventional additives of any type. Examples of these are antistatic agents, antioxidants, mold-release agents, flame retardants, lubricants, dyes, flow improvers, fillers, light stabilizers and organophosphorus compounds, such as phosphites, phosphorinanes, phospholanes or phosphonates, pigments, weathering stabilizers and plasticizers. However, the amount of additives is restricted in relation to the application.

Particularly preferred molding compositions which encompass poly(meth)acrylates are obtainable commercially with the trade name PLEXIGLAS® from Degussa AG. Preferred molding compositions which encompass cycloolefinic polymers may be purchased with the trade name ®Topas from Ticona and ®Zeonex from Nippon Zeon. Polycarbonate molding compositions are obtainable, by way of example, with the trade name ®Makrolon from Bayer or ®Lexan from General Electric.

The plastics substrate particularly preferably encompasses at least 80% by weight, in particular at least 90% by weight, based on the total weight of the substrate, of poly(meth)acrylates, polycarbonates and/or cycloolefinic polymers. The plastics substrates are particularly preferably composed of polymethyl methacrylate, and this polymethyl methacrylate may comprise conventional additives.

In one preferred embodiment, plastics substrates may have an impact strength to ISO 179/1 of at least 10 kJ/m$^2$, preferably at least 15 kJ/m$^2$.

The shape, and also the size, of the plastics substrate are not important for the present invention. Substrates generally used often have the shape of a sheet or a panel, and have a thickness in the range from 1 mm to 200 mm, in particular from 5 to 30 mm.

The plastics articles of the present invention are first provided with a siloxane coating which protects the plastics substrate from photocatalytic degradation due to the photocatalytically-acting covering layer.

Scratch-resistant siloxane lacquers which can be used to produce the coating (a) are known per se, and are used on polymeric glazing materials. Their inorganic character gives them good resistance to UV radiation and to weathering. By way of example, the production of these lacquers is described in EP-A-0 073911. Conventional lacquers are, inter alia, those which comprise water and/or alcohol as solvent, besides the siloxane condensation products.

These siloxane lacquers may be obtained, inter alia, via condensation or hydrolysis of organosilicon compounds of the general formula (I)

where $R^1$ is a group having from 1 to 20 carbon atoms, X is an alkoxy radical having from 1 to 20 carbon atoms, or a halogen, and n is an integer from 0 to 3, and where the various radicals X or $R^1$ may in each case be identical or different.

The expression "a group having from 1 to 20 carbon atoms" characterizes radicals of organic compounds having from 1 to 20 carbon atoms. It encompasses alkyl groups, cycloalkyl groups, aromatic groups, alkenyl groups and alkynyl groups having from 1 to 20 carbon atoms, and also heteroaliphatic and heteroaromatic groups which have in particular oxygen atoms, nitrogen atoms, sulfur atoms and phosphorus atoms, besides carbon atoms and hydrogen atoms. These groups mentioned may be branched or unbranched, and the radical $R^1$ here may be substituted or unsubstituted. Among the substituents are in particular halogens, groups having from 1 to 20 carbon atoms, nitro groups, sulfonic acid groups, alkoxy groups, cycloalkoxy groups, alkanoyl groups, alkoxycarbonyl groups, sulfonic ester groups, sulfinic acid groups, sulfinic ester groups, thiol groups, cyanide groups, epoxy groups, (meth)acryloyl groups, amino groups and hydroxy groups. For the purposes of the present invention, the term "halogen" means a fluorine atom, chlorine atom, bromine atom or iodine atom.

Among the preferred alkyl groups are the methyl, ethyl, propyl, isopropyl, 1-butyl, 2-butyl, 2-methylpropyl, tert-butyl, pentyl, 2-methylbutyl, 1,1-dimethylpropyl, hexyl, heptyl, octyl, 1,1,3,3-tetramethylbutyl, nonyl, 1-decyl, 2-decyl, undecyl, dodecyl, pentadecyl group, and the eicosyl group.

Examples of preferred cycloalkyl groups are the cyclopropyl, cyclobutyl, cyclopentyl, cyclohexyl and cycloheptyl group, and the cyclooctyl group, these having substitution, where appropriate, by branched or unbranched alkyl groups.

Among the preferred alkenyl groups are the vinyl, allyl, 2-methyl-2-propene, 2-butenyl, 2-pentenyl, 2-decenyl group, and the 2-eicosenyl group.

Among the preferred alkynyl groups are the ethynyl, propargyl, 2-methyl-2-propyne, 2-butynyl, 2-pentynyl group, and the 2-decynyl group.

Among the preferred alkanoyl groups are the formyl, acetyl, propionyl, 2-methylpropionyl, butyryl, valeroyl, pivaloyl, hexanoyl, decanoyl group, and the dodecanoyl group.

Among the preferred alkoxycarbonyl groups are the methoxycarbonyl, ethoxycarbonyl, propoxycarbonyl, butoxycarbonyl, tert-butoxycarbonyl, hexyloxycarbonyl, 2-methylhexyloxycarbonyl, or decyloxycarbonyl group, or dodecyloxycarbonyl group.

Among the preferred alkoxy groups are the methoxy, ethoxy, propoxy, butoxy, tert-butoxy, hexyloxy, 2-methylhexyloxy, or decyloxy group, or dodecyloxy group.

Examples of preferred cycloalkoxy groups are cycloalkoxy groups whose hydrocarbon radical is one of the abovementioned preferred cycloalkyl groups.

Among the preferred heteroaliphatic groups are the abovementioned preferred cycloalkyl radicals in which at least one carbon unit has been replaced by O, S or an $NR^8$ group, $R^8$ being hydrogen or an alkyl group having from 1 to 6 carbon atoms, or being an alkoxy or aryl group having from 1 to 6 carbon atoms.

According to the invention, aromatic groups are radicals of one or polynuclear aromatic compounds preferably having from 6 to 14 carbon atoms, in particular from 6 to 12 carbon atoms. Heteroaromatic groups are aryl radicals in which at least one CH group has been replaced by N, and/or at least two adjacent CH groups have been replaced by S, NH or O. According to the invention, preferred aromatic or heteroaromatic groups derive from benzene, naphthalene, biphenyl, diphenyl ether, diphenylmethane, diphenyldimethylmethane, bisphenone, diphenyl, sulfone, thiophene, furan, pyrrole, thiazole, oxazole, imidazole, isothiazole, isoxazole, pyrazole, 1,3,4-oxadiazole, 2,5-diphenyl-1,3,4-oxadiazole, 1,3,4-thiadiazole, 1,3,4-triazole, 2,5-diphenyl-1,3,4-triazole, 1,2,5-triphenyl-1,3,4-triazole, 1,2,4-oxadiazole, 1,2,4-thiadiazole, 1,2,4-triazole, 1,2,3-triazole, 1,2,3,4-tetrazole, benzo[b]thiophene, benzo[b]furan, indole, benzo[c]thiophene, benzo[c]furan, isoindole, benzoxazole, benzothiazole, benzimidazole, benzisoxazole, benzisothiazole, benzopyrazole, benzothiadiazole, benzotriazole, dibenzofuran, dibenzothiophene, carbazole, pyridine, pyrazine, pyrimidine, pyridazine, 1,3,5-triazine, 1,2,4-triazine, 1,2,4,5-triazine, quinoline, isoquinoline, quinoxaline, quinazoline, cinnoline, 1,8-naphthyridine, 1,5-naphthyridine, 1,6-naphthyridine, 1,7-naphthyridine, phthalazine, pyridopyrimidine, purine, pteridine, or 4H-quinolizine, diphenyl ether, anthracene and phenanthrene.

Preferred radicals $R^1$ can be represented by the formulae (II),

where m and n are numbers from 1 to 6, and p is zero or one, or the formula (III)

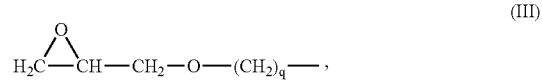

where q is a number from 1 to 6, or the formula (IV)

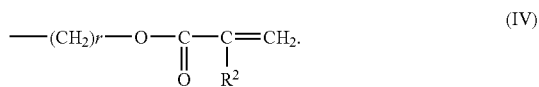

where $R_1$ is methyl or hydrogen and r is a number from 1 to 6.

The radical $R^1$ is very particularly preferably a methyl or ethyl group.

In relation to the definition of the group X in formula (I) in respect of the alkoxy group having from 1 to 20 carbon atoms and also of the halogen, reference may be made to the abovementioned definition, where the alkyl radical of the alkoxy group may likewise preferably be represented by the formulae (II), (III) or (IV) set out above. The group X preferably represents a methoxy or ethoxy radical or a bromine or chlorine atom.

These compounds may be used individually or as a mixture to prepare siloxane lacquers.

Depending on the number of the halogens or on the number of alkoxy groups bonded via oxygen to silicon, hydrolysis or condensation forms chains or branched siloxanes from the silane compounds of the formula (I). It is preferable for at least 60% by weight, in particular at least 80% by weight, of the silane compounds used to have at least three alkoxy groups or halogen atoms, based on the weight of the condensable silanes.

Tetraalkoxysilanes encompass tetramethoxysilane, tetraethoxysilane, tetra-n-propoxysilane, tetraisopropoxysilane and tetra-n-butoxysilanes;

trialkoxysilanes encompass methyltrimethoxysilane, methyltriethoxysilane, ethyltrimethoxysilane, n-propyl-trimethoxysilane, n-propyltriethoxysilane, isopropyl-triethoxysilane, isopropyltrimethoxysilane, isopropyltripropoxysilane, n-butyltrimethoxysilane, n-butyltriethoxysilane, n-pentyltrimethoxysilane, n-hexyltrimethoxysilane, n-heptyltrimethoxysilane, n-octyltrimethoxysilane, vinyltrimethoxysilane, vinyltriethoxysilane, cyclohexyltrimethoxysilane, cyclohexyltriethoxysilane, phenyltrimethoxysilane, 3-chloropropyltrimethoxysilane, 3-chloropropyltriethoxysilane, 3,3,3-trifluoropropyltrimethoxysilane, 3,3,3-trifluoropropyltriethoxysilane, 3-aminopropyltrimethoxysilane, 3-aminopropyltrimethoxysilane, 2-hydroxyethyltriethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxysilane, 3-mercaptopropyltrimethoxysilane, 3-mercaptopropyltrimethoxysilane, 3-isocyanatopropyltrimethoxysilane, 3-isocyanatopropyltriethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-(meth)acryloxypropyltrimethoxysilane, 3-(meth)acryloxypropyltriethoxysilane, 3-ureidopropyltrimethoxysilane and 3-ureidopropyltriethoxysilane;

dialkoxysilanes encompass dimethyldimethoxysilane, dimethyldiethoxysilane, diethyldimethoxysilane, diethyldiethoxysilane, di-n-propyldimethoxysilane, din-propyldiethoxysilane, diisopropyldimethoxysilane, diisopropyldiethoxysilane, di-n-butyldimethoxysilane, di-n-butyldiethoxysilane, di-n-pentyldimethoxysilane, di-n-pentyldiethoxysilane, di-n-hexyldimethoxysilane, di-n-hexyldiethoxysilane, di-n-peptyldimethoxysilane, di-n-peptyldiethoxysilane, di-n-octyldimethoxysilane, di-n-octyldiethoxysilane, di-n-cyclohexyldimethoxysilane, di-n-cyclohexyldiethoxysilane, diphenyldimethoxysilane and diphenyldiethoxysilane.

Particular preference is given to methyltrimethoxysilane, methyltriethoxysilane, ethyltrimethoxysilane and ethyltriethoxysilane. In one particular aspect of the present invention, the proportion or these particularly preferred alkyltrialkoxysilanes is at least 80% by weight, in particular at least 90% by weight, based on the weight of the silane compounds used.

In another aspect of the present invention, it is also possible to use siloxane lacquers which comprise colloidally dispersed $SiO_2$ particles. These solutions may be obtained by the sol-gel process, in particular by condensing tetraalkoxysilanes and/or tetrahalosilanes.

Aqueous coating compositions are usually prepared from the abovementioned silane compounds by hydrolyzing organosilicon compounds with an amount of water sufficient for the hydrolysis process, i.e.>, 0.5 mol of water per mole of the groups intended for hydrolysis, e.g. alkoxy groups, preferably with acid catalysis. Examples of acids which may be added are inorganic acids, such as hydrochloric acid, sulfuric acid, phosphoric acid, nitric acid, etc., or organic acids, such as carboxylic acids, organic sulfonic acids, etc., or acidic ion exchangers, the pH during the hydrolysis reaction generally being from 2 to 4.5, preferably 3.

Once the reactants have been combined, a rise in temperature is generally observed. In certain instances it can be necessary to introduce external heat in order to start the reaction, for example by heating the mixture to 40-50° C. Care is generally taken to prevent the reaction temperature from exceeding 55° C. The reaction time is generally relatively short, and is usually less than one hour, for example 45 min.

The silane compounds may be condensed to give polymers whose weight-average molar mass $M_w$ is generally from 100 to 20000 g/mol, from 200 to 10000 g/mol, and particularly preferably from 500 to 1500 g/mol. An example of a method for determining this molar mass is NMR spectroscopy.

Examples of ways of terminating the condensation reaction are cooling to temperatures below 0° C., or increasing the pH, using suitable bases, e.g. alkali metal hydroxides or alkaline earth metal hydroxides.

For further operations, a portion of the water/alcohol mixture and of the volatile acids may be removed from the reaction mixture, for example by distillation.

Suitable organic solvents, e.g. alcohols, such as ethanol, methanol, isopropanol, butanol, ethers, such as diethyl ether, dioxane, ethers and esters of polyols, e.g. ethylene glycol, propylene glycol, or ethers and esters of these compounds, hydrocarbons, e.g. aromatic hydrocarbons, ketones, such as acetone, methyl ethyl ketone, may then be used to adjust the solids content to about 15-35% by weight, based on the total weight of the mixture. Ethanol and/or 2-propanol is particularly preferred as solvent.

It has also proven advantageous to add, to the coating compositions, solvents which normally solvate the plastic intended as substrate for coating. In the case of polymethyl methacrylate (PMMA) as substrate, it is advisable to use, for example, an addition of solvents such as toluene, acetone, tetrahydrofuran in amounts making up from 2 to 20% by weight, based on the total weight of the compositions. The water content is generally set at from 5 to 20% by weight, preferably from 11 to 15% by weight, based on the total weight of the compositions.

To improve storage stability, the pH of the aqueous siloxane lacquers may be adjusted to the range from 3 to 6, preferably from 4.5 to 5.5. Additives, for example, may also be added for this purpose, in particular propionamide, these being described in EP-A-0 073 911.

The siloxane lacquers which can be used according to the invention may comprise curing catalysts, for example in the form of zinc compounds and/or of other metal compounds, such as cobalt compounds, copper compounds or calcium compounds, in particular their octoates or naphthenates. The content of the curing catalysts is generally from 0.1 to 2.5% by weight, especially from 0.2 to 2% by weight, based on the entire siloxane lacquer, but no resultant restriction is intended. Particular mention by way of example may be made of zinc naphthenate, zinc octoate, zinc acetate, zinc sulfate, etc.

The siloxane lacquers described above may be obtained commercially with the trade names ®Acriplex 100 and ®Acriplex 180 SR from Röhm GmbH & Co. KG.

The siloxane lacquers described above may be applied to the plastics substrate using any known method. Among these are immersion processes, spray processes, doctoring, flow coating methods, and application by roller or roll.

The siloxane lacquers thus applied may generally be cured in a relatively short period, for example within from 2 to 6 hours, generally within from about 3 to 5 hours, and at comparatively low temperature, for example at from 70 to 110° C., preferably at about 80° C., to give coatings with excellent scratch resistance and excellent adhesion.

The thickness of the layer of the siloxane coating (a) is relatively non-critical. However, after curing this variable is generally within the range from 1 to 50 µm, preferably from 1.5 to 30 µm, particularly preferably from 3 to 15 µm, with no intended resultant restriction. The layer thicknesses of the coatings (a) and/or (b) may be determined via a scanning electron micrograph (SEM).

In one particular aspect of the present invention, the polar component of the surface energy is preferably at most 8 mN/m, particularly preferably at most 6 mN/m after the curing of the first siloxane layer.

In one preferred embodiment of the present invention, the silicon content of the siloxane coating (a) after curing is at least 20% by weight, preferably at least 30% by weight, based on the total weight of the coating, with no intended resultant restriction. The carbon content is preferably at most 36% by weight, in particular at most 25% by weight, based on the total weight of the coating. These contents may be determined by elemental analysis using the J. Liebig method or by atomic absorption spectroscopy (AAS).

After the curing of the first siloxane coating, the surface is activated by increasing the polar component of the surface energy of the cured siloxane coating to a value of at least 10 mN/m. It is particularly preferable for the polar component of the surface energy to be increased to at least 15 mN/m.

The surface energy is determined by the Ownes-Wendt-Rabel & Kaelble method. For this, series of measurements are carried out using the Busscher standard series in which the test liquids used are water [ST 72.1 mN/m], formamide [ST 56.9 mN/m, diiodomethane [ST 50.0 mN/m] and alpha-bromonaphthalene [ST 44.4 mN/m]. Measurement is carried out at 20° C. The surface tension and the polar and dispersion components of these test liquids are known, and these are used to calculate the surface energy of the substrate.

The surface energy may be determined using a G40 contact angle measurement system from Krüss, Hamburg, the method being described in the user manual for the G40 contact angle measurement system, 1993. In relation to the methods of calculation, reference may be made to A. W. Neumann, Über die Messmethodik zur Bestimmung grenzflächenenergetischer Größen [Measurement methods for determining surface energy variables], Part I, Zeitschrift für Phys. Chem., Vol. 41, pp. 339-352 (1964), and A. W. Neumann, Über die Messmethodik zur Bestimmung grenzflächenenergetischer Größen [Measurement methods for determining surface energy variables], Part II, Zeitschrift für Phys. Chem., Vol. 43, pp. 71-83 (1964).

The various physical and chemical methods are suitable for activating the siloxane underlacquer. Among these are treatment of the surface by chemical methods, in particular by aqueous solutions, corona treatment, flame treatment, plasma treatment or atmospheric plasma treatment. Preference is given here to chemical methods and corona treatment.

The activation may take place by chemical means, by subjecting the substrate coated with siloxane underlacquer to treatment with, preferably liquid, reagents. It is preferable here that the incipient etching process affects only the uppermost atomic layers of the siloxane lacquer. In one particular aspect, the surface is treated with an alkaline solution whose pH is at least 10, preferably at least 12.

For example, the siloxane-lacquer-coated substrate may be treated with an aqueous and/or alcoholic solution of alkali metal hydroxides. Preferred alcohols are methanol, ethanol, propanol and/or butanol. The concentration of the alkali metal hydroxides is preferably in the range from 1 to 20% by weight, in particular from 2 to 10% by weight, based on the weight of the etching solution. Particular alkali metals are lithium, sodium, potassium, rubidium and/or cesium. Among these, preference is given to sodium and/or potassium.

The period of exposure to the alkaline solution depends on the pH and may therefore be within a wide range. However, a few minutes are generally sufficient. The period of exposure to the alkaline solution is particularly preferably in the range from 30 seconds to 60 minutes, in particular from 1 minute to 10 minutes. By way of example, this surface treatment may be terminated by neutral wash or addition of acids.

Any known method may be used to apply the alkaline solutions to the siloxane coating. These methods have been described above.

The polar component of the surface energy may moreover be increased by corona treatment. By way of example, this method is described in EP-A-1 180 426. The treatment period depends on the energy used and is preferably in the range from 1 to 20 seconds, in particular from 2 to 5 seconds. By way of example, a generator suitable for corona treatment may be purchased from Softal Electronic GmbH, Hamburg, and can be operated in the high-frequency range at from 20 to 30 kHz (generator 3005).

After the activation of the first siloxane layer, in which no photocatalytic content is present, a second layer comprising $TiO_2$ particles is applied.

The lacquer for producing the second layer may be substantially identical with the first siloxane lacquer, but it is necessary to introduce photocatalytic $TiO_2$ particles.

By way of example, a lacquer of this type may be produced by mixing a siloxane lacquer described above with an aqueous and/or alcoholic composition comprising $TiO_2$ particles.

Particularly suitable coating compositions are in particular those which comprise colloidally dispersed $SiO_2$ particles. These particles preferably have the same size as the $TiO_2$ particles described below. Dispersions of this type may be produced by the sol-gel process, in particular condensing tetraalkoxysilanes and/or tetrahalosilanes.

Compositions of this type comprising $TiO_2$ particles are known, inter alia, from EP-A-0 826 663, EP-A-0 850 203 and EP-1 022 318. Compositions of this type may also, by way of example, be obtained commercially from Showa Denko Kabushiki Kaisha, Japan with the trade name NTB 30A or from Toto Ltd., Japan.

The $TiO_2$ particles are photocatalytic. At least some of the $TiO_2$ particles are therefore in the brookite and/or anatase form. The particle size is non-critical, but the transparency depends on the particle size. The size of the particles is preferably at most 300 nm and in particular in the range from 1 to 200 nm, preferably from 1 to 50 nm.

The second layer, comprising $TiO_2$ particles, may be applied and cured by the abovementioned methods.

In one particular embodiment, the amount of the $TiO_2$ particles present in the second coating is from 0.01 to 90% by weight, preferably from 0.1 to 75% by weight, based on the total weight of the second coating after curing.

The thickness of the siloxane coating (b) comprising the $TiO_2$ particles is likewise non-critical. After curing this thickness is generally in the range from 0.05 to 2 μm, preferably from 0.1 to 1 μm.

In one particular embodiment of the plastics article, the total layer thickness of coatings (a) and (b) after curing is in the range from 2 to 30 μm, in particular from 3 to 15 μm.

The plastics articles of the present invention, provided with a photocatalytic coating, have high scrub resistance. The scrub resistance to DIN 53778 is preferably greater than or equal to 10 000 cycles, in particular greater than or equal to 15 000 cycles and particularly preferably greater than or equal to 20 000 cycles.

In one particular aspect of the present invention, the plastics article is transparent, the transparency $\tau_{D65/10}$ to DIN 5033 being at least 70%, preferably at least 75%.

The plastics article preferably has a modulus of elasticity to ISO 527-2 of at least 1000 MPa, in particular at least 1500 MPa, with no intended resultant restriction.

The plastics articles of the invention are generally very resistant to weathering. For example, the weathering resistance to DIN 53387 (Xenotest) is at least 5000 hours.

Even after extended UV irradiation for more than 5000 hours, the yellowness index to DIN 6167 (D65/10) of preferred plastics articles is smaller than or equal to 8, preferably smaller than or equal to 5, with no intended resultant restriction.

By way of example, the plastics articles of the present invention may be used in the building sector, in particular for the production of greenhouses or conservatories, or as a noise barrier.

The invention is illustrated in further detail below by inventive examples and comparative examples, but there is no intention that the invention be restricted to these examples.

INVENTIVE EXAMPLE 1

PMMA sheets of size 150*350*3 mmm were provided with a scratch-resistant lacquer (®Acriplex 100 SR, Röhm GmbH & Co. KG), the layer thickness of the lacquer after curing being 7.5 μm.

After the curing of the lacquer, the polar component of the surface energy was 5.5 mN/m. The surface was then treated for five minutes with a 5% KOH water/ethanol mixture (1:3 parts by weight), followed by neutral wash. The surface energy was determined using a G40 contact angle measurement system from Krüss, Hamburg, the test liquids used comprising water [ST 72.1 mN/m]], formamide [ST 56.9 mN/m], diiodomethane [ST 50.0 mN/m] and alpha-bromonaphthalene [ST 44.4 mN/m]. The polar component of the surface energy was 15.3 mN/m.

After the activation, flow coating was used to apply a colloidal solution comprising $TiO_2$ particles and comprising $SiO_2$ particles (3:1 mixture of NTB 30A ($TiO_2$) with NTB 30B ($SiO_2$) obtainable from Showa-Denko). The flow of the lacquer and the adhesion were good. The resultant coating was cured for three hours at 80° C.

A Gardner M 105/A wet scrub tester was used for the scratch resistance of the coating in the DIN 53778 wet scrub test. The value determined was 20 000 cycles.

INVENTIVE EXAMPLE 2

Inventive Example 1 was in essence repeated, but NaOH was used instead of KOH. The polar component of the surface energy was 12.8 mN/m.

The flow and the adhesion of the second coating was likewise good, and the scratch resistance determined was 15 000 cycles.

INVENTIVE EXAMPLE 3

Inventive Example 1 was in essence repeated, but the first coating was activated by Corona treatment. Here, the sheet was passed four times at 1 m/min through a Corona system (Softal Electronic GmbH, Hamburg, high-frequency range at from 20 to 30 kHz).

The flow and the adhesion of the second coating was likewise good, and the scratch resistance determined was 12 000 cycles.

COMPARATIVE EXAMPLE 1

Inventive Example 1 was in essence repeated, but $H_3PO_4$ was used instead of KOH. The polar component of the surface energy was 6.5 mN/m.

The flow and the adhesion of the second coating was so poor as to prevent any determination of scratch resistance.

COMPARATIVE EXAMPLE 2

Inventive Example 1 was in essence repeated, but no activation took place. The polar component of the surface energy was 5.5 mN/m.

The flow and the adhesion of the second coating was so poor as to prevent any determination of scratch resistance.

COMPARATIVE EXAMPLE 3

Inventive Example 1 was in essence repeated, but the first coating was subjected to incomplete curing. The curing times were from 0.5 to 2.0 hours at 80° C.

The flow of the coating solution on the partially cured layer was unsatisfactory, and curing of the second layer gave a mechanically unstable coating which now lacked scratch resistance and which could be damaged even by rubbing with a cloth. Determination of scratch resistance was not possible.

The invention claimed is:

1. A self-cleaning plastics article produced by a process comprising:
    (i) applying a siloxane coating (a) to a plastic substrate,
    (ii) curing the siloxane coating (a) to obtain a cured siloxane coating,
    (iii) increasing the polar component of the surface energy of the cured siloxane coating to a value of at least 10 mN/in to obtain a polar coating,
    (iv) applying a coating (b) comprising photocatalytic $TiO_2$ particles to the polar coating, and
    (v) curing the coating (b) to obtain the self-cleaning plastics article.

2. The plastics article according to claim 1, wherein the plastic substrate comprises at least one polymer selected from the group consisting of cycloolefin copolymers, polyethylene terephthalates, polycarbonates, and poly(meth)acrylates.

3. The plastics article according to claim 2, wherein the polymer is polymethyl methacrylate.

4. The plastics article according to claim 1, wherein the plastic substrate has an impact strength of at least 10 $kJ/m^2$ to ISO 179/1.

5. The plastics article according to claim 1, wherein the plastic substrate has a thickness in the range from 1 mm to 200 mm.

6. The plastics article according to claim 1, wherein the siloxane coating comprises at least 80% by weight of alkyltrialkoxysilanes, based on the content of condensable silanes.

7. The plastics article according to claim 1, wherein the siloxane coating comprises condensable polysiloxanes whose molar mass is in the range from 500 to 1500 g/mol.

8. The plastics article according to claim 1, wherein the proportion of silicon in the siloxane coating (a) is at least 30% by weight, based on the total weight of the coating.

9. The plastics article according to claim 1, wherein the polar component of the surface energy of the siloxane coating (a) is lowered by curing to a value smaller than or equal to 6 mN/m before said increasing the polar component of the surface energy to at least 10 mN/m.

10. The plastics article according to claim 1, wherein said increasing the polar component of the surface energy of the cured siloxane coating comprises treating with alcoholic potassium hydroxide solution.

11. The plastics article according to claim 1, wherein the $TiO_2$ particles have a size in the range from 1 nm to 300 nm.

12. The plastics article according to claim 1, wherein the coating (b) comprises from 0.01 to 90% by weight of the $TiO_2$ particles, based on the total weight of the coating (b) after curing.

13. The plastics article according to claim 1, wherein the layer thickness of the siloxane coating (a) after curing is in the range from 1.5 to 30 μm.

14. The plastics article according to claim 1, wherein the layer thickness of the coating (b) after curing is in the range from 0.01 to 2 μm.

15. The plastics article according to claim 1, wherein the layer thickness of the coatings (a) and (b) after curing is in the range from 3 to 15 μm.

16. The plastics article according to claim 1, wherein the scrub resistance of the plastics article according to DIN 53778 is at least 15,000.

17. The plastics article according to claim 1, wherein the plastics article has a modulus of elasticity according to ISO 527-2 of at least 1500 MPa.

18. The plastics article according to claim 1, wherein the plastics article has a weathering resistance according to DIN 53 387 of at least 5000 hours.

19. The plastics article according to claim 1, wherein the plastics article has a transparency according to DIN 5033 of at least 70%.

20. The plastics article according to claim 1, wherein the plastics article has a yellowness index smaller than or equal to 5 after 5000 hours of UV irradiation.

21. The plastics article according to claim 1, wherein the polar component of the surface energy of the cured siloxane coating is increased to a value of at least 15 mN/m.

22. The plastics article according to claim 1, wherein the polar component of the surface energy of the cured siloxane coating is increased by corona treatment.

23. The plastics article according to claim 1, wherein increasing the polar component of the surface energy of the cured siloxane coating includes treating the cured siloxane coating with an alkaline solution having a pH of at least 10.

24. The plastics article according to claim 1, having a wet scrub value of at least 20,000 cycles according to DIN 53778.

25. A process for producing a self-cleaning plastics article, comprising:
    (i) applying a siloxane coating (a) to a plastic substrate,
    (ii) curing the siloxane coating (a) to obtain a cured siloxane coating,
    (iii) increasing the polar component of the surface energy of the cured siloxane coating to a value of at least 10 mN/m to obtain a polar coating,
    (iv) applying a coating (b) comprising photocatalytic $TiO_2$ particles to the polar coating, and
    (v) curing the coating (b) to obtain the self-cleaning plastics article.

* * * * *